United States Patent [19]

Cain

[11] Patent Number: 5,314,515
[45] Date of Patent: May 24, 1994

[54] METHOD AND APPARATUS FOR FIBER COOLING

[75] Inventor: Michael B. Cain, Corning, N.Y.

[73] Assignee: Corning Incorporated, Corning, N.Y.

[21] Appl. No.: 913,182

[22] Filed: Jul. 14, 1992

[51] Int. Cl.$^5$ ............................ C03B 37/023
[52] U.S. Cl. ........................ 65/3.11; 65/12; 65/3.43
[58] Field of Search ............ 65/2, 3.11, 12, 13

[56] References Cited

U.S. PATENT DOCUMENTS

| | | | |
|---|---|---|---|
| 3,759,681 | 9/1973 | Russell | 65/12 |
| 3,867,118 | 2/1975 | Russell | 65/12 |
| 4,125,387 | 11/1978 | Gunter | 65/2 |
| 4,437,870 | 3/1984 | Miller | 65/12 |
| 4,514,205 | 4/1985 | Darcangelo et al. | 65/12 |
| 4,583,485 | 4/1986 | Smith | 118/68 |
| 4,664,689 | 5/1987 | Davis | 65/3.11 |
| 5,043,001 | 8/1991 | Cain et al. | 65/2 |

*Primary Examiner*—Robert L. Lindsay
*Attorney, Agent, or Firm*—Kees van der Sterre

[57] ABSTRACT

A method and apparatus for cooling a glass optical fiber drawn from a glass preform, prior to applying a protective coating to the fiber, wherein the fiber is transported through a cooling zone containing coolant consisting of a solid or liquid dispersion of a condensible gas, the gas being a chemical element or compound having a vapor pressure of at least 1 atmosphere at 25° C. such that rapid coolant vaporization at ambient temperatures is insured, are provided.

8 Claims, 2 Drawing Sheets

METHOD AND APPARATUS FOR FIBER COOLING

BACKGROUND OF THE INVENTION

The present invention relates to a method and apparatus for cooling hot glass fibers or filaments as they are drawn from molten glass in a furnace.

In processes such as the manufacture of glass optical waveguides, glass fibers are drawn at very high speeds from a molten glass preform positioned in a drawing furnace. Very rapid cooling of the glass fiber is required during such manufacture in order to reduce the temperature of the glass to a level at which the fiber may be protectively coated. The speed of cooling can in fact become a critical rate-limiting step for optical fiber production, since the technology of rapidly coating optical fibers, as well as the technology of rapid fiber drawing, is well developed.

A number of different methods for cooling optical fibers at rapid rates have been proposed. U.S. Pat. Nos. 4,437,870 and 4,514,205 utilize cold flowing gases to cool the fibers, while U.S. Pat. No. 4,664,689 utilizes a combination of radiative cooling and cryogenic gas cooling to further increase the cooling rate.

In addition to radiative and gas cooling of optical fibers, it has also been proposed to utilize conductive cooling via the direct application of cooling liquids to the surfaces of the fibers. U.S. Pat. No. 4,583,485 employs a preapplication of liquid coating components to achieve quench-cooling of the fiber surfaces, while U.S. Pat. No. 5,043,001 uses water or a vaporizable organic liquid for fiber cooling. The apparatus used in the latter patent includes a provision for removing the coolant liquid from the surfaces of the fiber prior to coating.

The use of liquid-phase quenching media to cool optical fiber is attractive because of the relatively high heat extraction rates available through the vaporization of cooling liquids. However, the disadvantages of such cooling include a substantial risk, particularly at higher fiber surface temperatures, that surface contact with substantial masses of liquid applied at temperatures much lower than fiber surface temperatures could introduce thermal stresses or cause breakage of the optical fiber. Moreover, as noted in U.S. Pat. No. 5,043,001, for most cooling liquids it is important that complete liquid removal from the surfaces of the cooled fiber be achieved prior to the time fiber coating material is applied to the fiber. The temperature range through which optical fiber must be cooled in order to prepare it for coating is a range extending from about 1500° C. or above down to approximately 50° C.. At temperatures near the upper extreme of this range, radiative cooling is efficient and rapid cooling of the fiber can readily be achieved.

In the mid-range of temperatures, e.g., from about 1000° to about 500° C., radiative cooling becomes less efficient. Therefore, in this range, convective or conductive cooling of the fiber by gases of high thermal conductivity, typically supplied at cryogenic temperatures, is preferred to achieve high cooling efficiencies.

An important shortcoming of present cooling procedures, however, is that of achieving rapid cooling through the lowest temperature regime, i.e., through the temperature range of about 500°–50° C. In this range, neither forced gas convection cooling nor radiative cooling provides rapid enough energy transfer to achieve an efficient reduction of fiber temperatures. This is due to the fact that the differences in temperature between the glass fiber and the cooling medium are relatively small, such that heat transfer rates between the fiber and the cooling medium are low.

For these reasons it is evident that major improvements in cooling efficiency over the lower ranges of fiber surface temperature will be required if further large increases in fiber drawing rates are to be achieved.

It is therefore a principal object of the present invention to provide improved fiber cooling methods, and apparatus for practicing those methods, which offer accelerated fiber cooling particularly at the lower extremes of the conventional fiber cooling range.

Other objects and advantages of the invention will become apparent from the following description.

SUMMARY OF THE INVENTION

The present invention achieves a substantial acceleration of fiber cooling at low to moderate fiber temperatures through the use of a condensible gas cooling medium which is used as a fiber coolant in its condensed or liquified form. The condensed or liquid phase material, which is supplied directly to the surface of the fiber or closely adjacent thereto, is sufficiently vaporizable at temperatures in the region of the fiber surface that it is rapidly volatilized even at surface temperatures in the lower end of the fiber cooling range.

The heat of vaporization needed to vaporize the condensed phase is relatively high, thus insuring an extremely high heat transfer rate from the fiber to the vaporizing coolant even at the aforementioned low fiber surface temperatures. Further, since complete vaporization of the condensible gas coolant from the fiber surfaces occurs even at low fiber temperatures, there is no problem of residual fluid on the fiber surface to interfere with the subsequent coating process.

In a first aspect, then, the invention comprises a method for cooling a glass fiber, such as an optical waveguide fiber being drawn from a glass preform, which comprises the step of transporting the fiber through a cooling zone containing a coolant in the form of a condensed gas. Typically, the coolant is a liquified or solidified condensed gas, the gas having a chemical composition such that it rapidly vaporizes and remains in the gas phase without significant condensation at normal room temperatures (e.g., temperatures of 25° C. and above).

Suitable gases may thus be characterized as consisting essentially of one or a mixture of chemical elements or compounds having a vapor pressure of at least one atmosphere at 25° C. In the preferred process, the condensed gas will be introduced into the cooling zone as a liquified gas in finely divided or sprayed form, although introduction in the form of one or more streams of liquified gas would effect the required rapid cooling.

The invention further comprises apparatus for the cooling of glass optical fibers which is particularly useful for cooling fibers in the low temperature regime, but which is well suited for fiber cooling at higher temperatures as well. Included in the apparatus is a cooler which effectively utilizes a condensed gas coolant to achieve rapid continuous cooling of glass fiber drawn therethrough.

The central element of the apparatus is an elongated walled enclosure which defines and surrounds a fiber cooling zone wherein a glass fiber traversing the zone may be exposed to the condensed coolant. Inlet and outlet openings disposed at opposite ends of the elongated enclosure provide means for drawing fiber continuously through the enclosure.

Positioned exteriorly of and encircling at least a portion of the walled enclosure are refrigeration or other cooling or condensing means such as a reservoir for a cryogenic liquid. The condensing means are spaced away from the outer wall of the walled enclosure such that an annular space is formed therebetween. This annular space, typically enclosed at each end, provides a condensate reservoir or chamber wherein condensation and/or redistribution of condensed coolant prior to its transport into the fiber cooling zone can be achieved.

Communicating with the annular condensate reservoir is a fiber coolant inlet, this inlet providing the means for introducing a condensible or condensed fiber coolant into the reservoir for condensation and/or transport into the fiber cooling zone. Once introduced into the condensate reservoir, the condensed fiber coolant is directed into the fiber cooling zone through multiple fluid inlet perforations in the enclosure wall between the reservoir and the cooling zone. These inlet perforations thus provide multiple paths for condensate transport into the fiber cooling zone.

In the preferred embodiment, the perforations are provided in the form of a plurality of horizontal slots communicating with the fiber cooling zone which offer a cross flow entry path for coolants fed from the condensate reservoir and into the cooling zone. This cross-flow coolant pattern results in minimal fiber disturbance and a cooling rate which is not highly sensitive to the lateral position of the fiber in the fiber cooling zone.

If desired, the perforated inner wall surrounding the cooling zone may further comprise a surface finish or coating enhancing radiation absorption, for effecting more efficient radiative cooling of the fiber. This is particularly useful in cases where it is desired to adapt the apparatus for use in the higher temperature fiber cooling regime.

As suggested above, then, the apparatus of the invention offers multiple operating modes for fiber cooling depending upon the temperature of the optical fiber to be cooled therein. Where the fiber is at a high temperature, the apparatus may provide pure radiative cooling or radiative cooling plus conductive cooling by means of a conventional heat transfer gas introduced through the slots.

At moderate fiber temperatures, where radiative cooling is slow, heat conduction or convective cooling with a refrigerated heat transfer fluid, e.g., argon gas supplied at cryogenic temperatures, may be provided. Finally, at temperatures in the lower portion of the fiber cooling range, liquid phase cooling with a condensible gas in accordance with the method of the invention may be utilized to greatly speed up the fiber cooling rate toward a suitable temperature for subsequent coating processes.

The versatility of the apparatus above described is such that several of the units can be used cooperatively as the components of a multi-unit cooling system in a tandem cooling arrangement. Each cooler will have the same basic configuration, but each unit in the series will operate in a different cooling mode in order to optimize the fiber cooling rate for the particular temperature of the fiber passing therethrough.

DESCRIPTION OF THE DRAWING

The invention may be further understood by reference to the drawing wherein.

DESCRIPTION OF THE PREFERRED EMBODIMENTS

Figure 1:
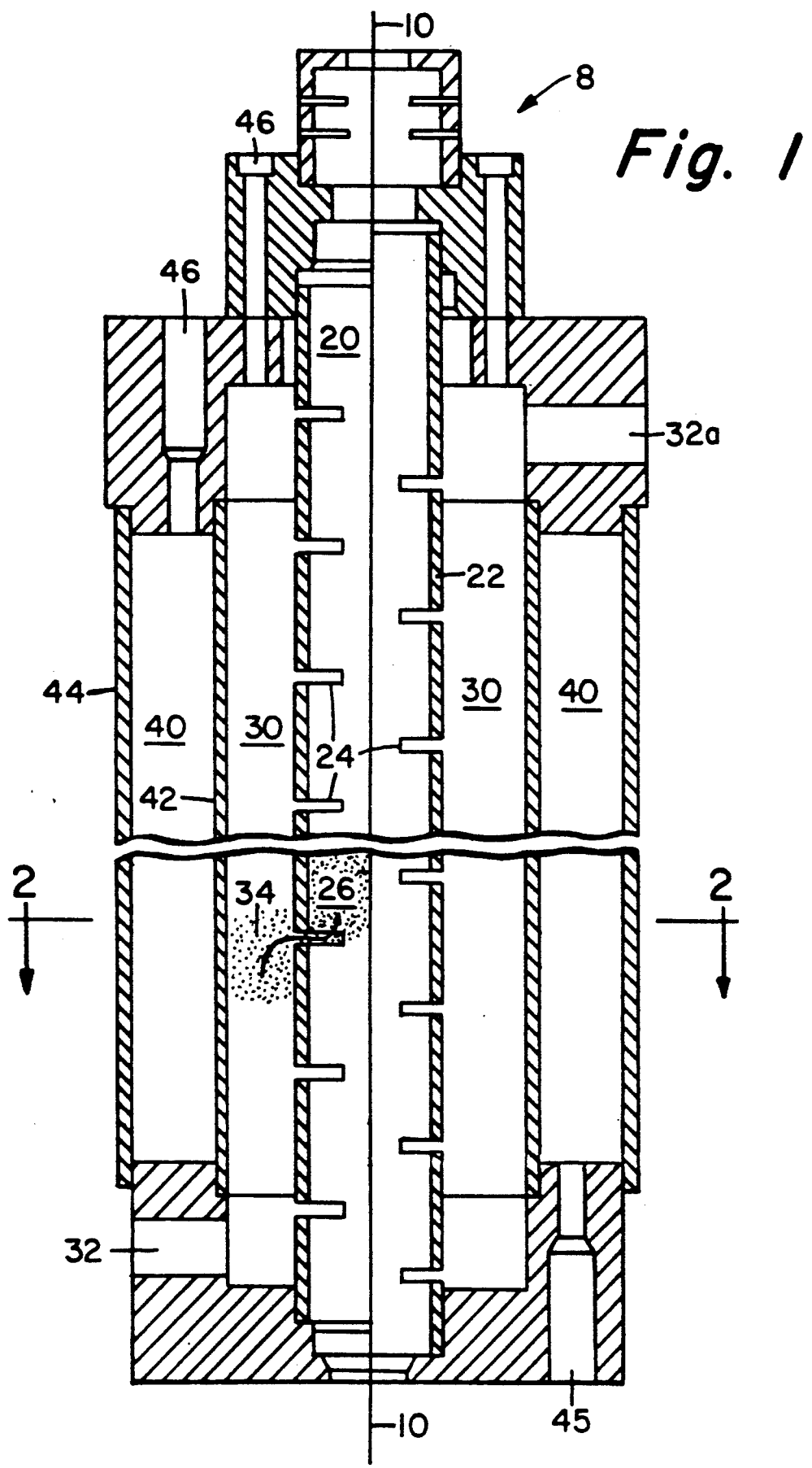
FIG. 1 is a schematic elevational view in cross-section of apparatus in use for fiber cooling in accordance with the invention.

Referring more particularly to the FIG. 1 of the drawing, which is a schematic illustration (not in true proportion or to scale) of a preferred design for a cooling apparatus 8 provided in accordance with the invention, a glass optical fiber 10 is shown moving downwardly through an elongated enclosure 20 formed by a substantially cylindrical perforated metal tube 22. The apparatus will typically be 2 to 3 times longer than shown in the drawing, but with the omitted central portion (as shown by the break lines) having a structure the same as that of the structure immediately adjacent the break.

Tube 22, which may be formed of stainless steel or the like, incorporates a multiplicity of perforations in the tube sidewall, as represented by selected perforations marked 24 in the drawing. All perforations such those marked 24 are preferably provided in the form of slots transverse to the central axis of the tube, as shown. These slots are cut through the tube sidewall and provide the means for introducing a fiber coolant into enclosure 20 for fiber cooling. Representative paths for fiber coolant ingress are indicated by arrows 26; other paths would be associated with each of the other slots such as slots 24 shown in the drawing.

Positioned externally of tube 22 in the apparatus is an annular condensate chamber or reservoir 30. That reservoir provides a space for uniformly distributing a selected condensed or condensible fiber coolant, introduced for example via coolant bottom inlet port 32. The coolant thus introduced is distributed about the exterior of tube 22 such that even feeding thereof through slots 24 into enclosure 20 can be achieved. Chamber 30 also acts as a condensation zone, if needed, wherein the fluid selected to serve as the fiber coolant may be condensed if not already condensed as it is uniformly distributed prior to introduction into enclosure 20.

Condensate reservoir 30 is bounded by a cooling or refrigeration system, such as an annular cryogenic liquid reservoir 40 adapted to contain a cryogenic cooling liquid between inner and outer walls 42 and 44, respectively. When so filled, this reservoir constitutes an efficient means for cooling chamber 30 and fiber coolant contained therein.

Figure 2:
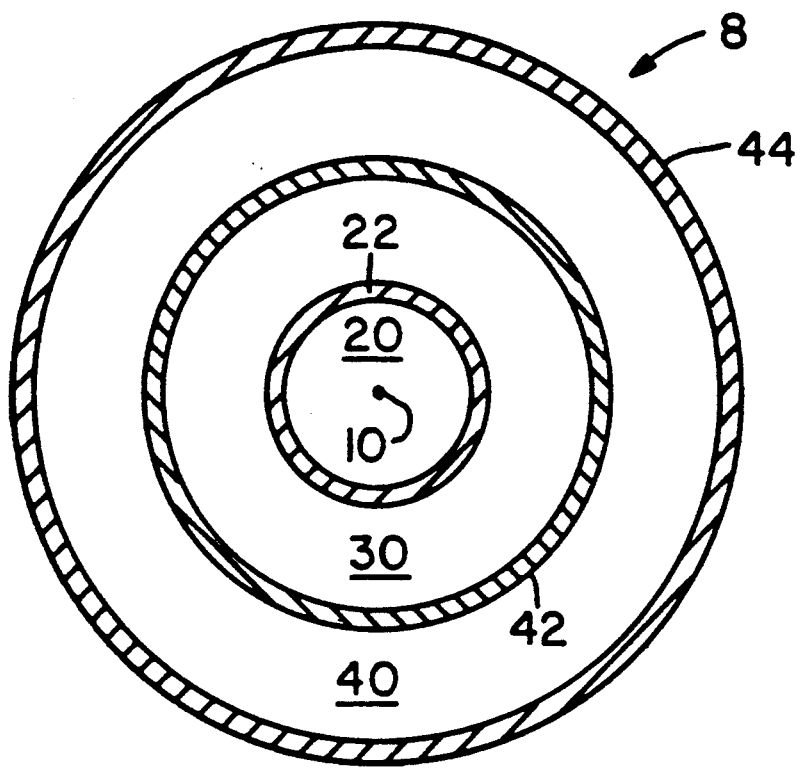
FIG. 2 is a schematic cross-sectional of the apparatus of FIG. 1 along line 2—2 thereof.

A schematic cross-sectional view of the apparatus 8 taken along line 2—2 of FIG. 1 is provided as FIG. 2 of the drawing.

If containing a cryogenic cooling liquid, the walls of reservoir 40 may be constructed, for example, of stainless steel. Referring again to FIG. 1, the cryogenic cooling liquid may be introduced into bottom port 45 at the bottom of the fluid reservoir and exit therefrom through top port 46.

The cryogenic cooling liquid provided in reservoir 40 will be one having a temperature sufficiently low to cool condensate reservoir 30 to a level sufficient to maintain coolant present in reservoir 30 in a condensed state, or to achieve condensation of at least some fraction of the selected fiber coolant introduced into condensation chamber 30 if such is introduced therein as a non-condensed gas.

During operation of the cooler, condensate formed or maintained by refrigeration of the fiber coolant will take the form of a particulate dispersion of a liquid or solid chemical element or compound. This dispersion is schematically illustrated by particles 34 in FIG. 1. The dispersion will be sufficiently fine that the condensate can easily be transported into cooling tube 22 by uncondensed vapors or other carrier gases. The temperature required for adequate condensation will of course depend on the fiber coolant, and is readily determined by routine experiment.

Condensed fiber coolant transported into fiber cooling tube 22 via slots 24 will be substantially re-vaporized in the fiber cooling zone. The re-vaporized fiber coolant can thereafter be allowed to exit the cooling tube, for example at the top or fiber inlet end thereof. Alternatively, vapor collection means may be disposed at an outlet from the apparatus, positioned for example near the fiber inlet end thereof or at top port 32a, so that the condensible fiber coolant may be collected for recondensation and reuse.

While as previously noted, any refrigerant or refrigeration apparatus having the capability of cooling chamber 20 to a temperature sufficiently low to achieve condensation of that coolant can be used in the invention, the preferred refrigerants are liquified gases or gas mixtures such as air. The particularly preferred refrigerant for chamber 20 is liquid nitrogen.

The condensible coolant used for fiber cooling in the method of the invention will be a chemical element or compound which vaporizes rapidly at ambient temperatures (i.e., at 25° C.). More preferably, the coolant will have a vapor pressure in excess of 1 atmosphere (i.e., will boil) at ambient temperatures and above. An example of a particularly preferred fiber coolant is argon, which can be condensed to a liquid at liquid nitrogen temperatures.

Where less rapid cooling of the fiber is required other condensible materials which require less extensive cooling to condense to liquid or solid phases in the condensation zone may be used. Examples of alternative cooling materials include carbon dioxide or even halogenated hydrocarbons having high vapor pressure at ambient temperatures.

The fiber coolant selected can be introduced into chamber 30 as a pure gas stream or as a mixture of a condensible gas with another gas which may serve as a carrier. It is generally desirable that, when delivered through slots 24 and into enclosure 20, the fiber cooling medium consist of a mixture of a gas and a particulate liquid or solid wherein the particulates are reasonable uniformly distributed.

The invention may be further understood by reference to the following detailed hypothetical Example illustrating the use of the apparatus shown in the drawing for the rapid cooling of an optical fiber.

EXAMPLE

Apparatus having a configuration substantially as shown in the drawing is first provided. In that apparatus, the fiber cooling tube 24, composed of stainless steel, has a length of about 24 inches and includes slots in opposing positions across the axis of the tube as shown in the drawing. The slots employed have a slot width of about 0.010 inches (0.25 mm). This slot positioning generates cross-flow circulation patterns for the coolant entering the tube, thus minimizing the disturbance of fiber being drawn through the tube. The staggering of the slots as shown provides greater fiber coverage.

A supply of liquid nitrogen is connected to fluid inlet port 45 at the bottom of reservoir 40 so that the reservoir may be continuously filled and replenished with liquid nitrogen. When liquid nitrogen is present in reservoir 40 the temperature of the inner reservoir wall 42 approaches 77° K.

After the reservoir has filled with liquid nitrogen, a glass fiber is dropped through tube 22 and drawing of the fiber from a preform located in a drawing furnace positioned above the cooling apparatus is commenced. Once the draw rate of the fiber has been stabilized, a flow of condensible fiber coolant consisting of 50% helium and 50% of argon by volume into top inlet port 32 is commenced at a flow rate of about 50 slpm. (For this mixture of condensible argon in a helium carrier, the argon content must be at least about 29% by volume in order to achieve condensation of the argon at liquid nitrogen temperatures).

As the fiber coolant enters condensation chamber 30, condensation of the coolant commences to provide a suspension of fine droplets of coolant in the coolant stream. The stream with condensed coolant then enters enclosure 20 through sidewall slots 24 and is directed against the fiber being drawn through the enclosure at multiple points along its length.

Although the flow rate of fiber coolant into port 32 may be relatively high, condensation of the coolant in chamber 30 reduces the volume of the vapor stream. This reduction, together with the configuration of coolant delivery slots 24 in tube 22, are such that the velocity of the gas streams being directed into enclosure 20 remain somewhat low, as well as relatively constant over a wide entrance angle into the enclosure. Thus, again, gas jets which would disturb the fiber traversing the tube are avoided.

Fiber cooling by the entering gas streams carrying coolant condensate is expected to be very high even in the low temperature fiber cooling regime, due to the very high heat capacity of the mixture. At a fiber draw rate of 20 m/sec, calculations indicate a reduction in fiber temperature from about 500° C. to at least about 50° C. close to ambient should be achieved in a cooling enclosure having a length of not more than about 1 meter.

A further specific advantage of this cooling procedure is that post-treatment of the cooled fiber prior to the application of a protective coating is not required. Hence, vaporization of residual coolant from the fiber surface upon exiting the cooling enclosure is extremely rapid at normal ambient temperatures, so that no processing to remove residual coolant is needed.

Of course, the foregoing example is merely illustrative of methods and apparatus which may be employed in the practice of the invention within the scope and spirit of the appended claims. Thus, for example, when using the apparatus of the invention at substantially higher fiber temperatures where radiative cooling is efficient, less cooling of the fiber coolant is needed since the delta T driving force cooling the fiber is large. And, at intermediate temperatures in the 500°–1000° C. range, any radiation-absorbing coating on the interior wall of the cooling chamber will continue to assist in fiber cooling, so that a vapor stream provided at cryogenic temperatures but not necessarily including condensed coolant can be efficient.

Finally, in the low temperature regime, extending from about 500° C. to about 50° C., the nature of the surface on the perforated tube defining the cooling zone is relatively unimportant since conduction constitutes the predominant cooling mechanism and the presence in the cooling zone of liquid or solid condensate to increase the heat capacity of the cooling fluid becomes the most important factor governing efficient fiber cooling.

I claim:

1. A method for cooling a glass optical fiber as drawn from a glass preform to reduce the temperature thereof to a temperature in the range for coating the fiber which comprises the step of transporting the fiber through a cooling zone containing coolant consisting of a solid or liquid dispersion of a chemical element or compound having a vapor pressure of at least 1 atmosphere at 25° C.

2. A method in accordance with claim 1 wherein coolant consists of a liquified gas in finely divided form.

3. A method in accordance with claim 2 wherein the fiber is cooled over all or a portion of the temperature range of 50°–500° C.

4. A method in accordance with claim 3 wherein the temperature of the fiber exiting the cooling zone does not exceed about 200° C.

5. A method in accordance with claim 1 wherein the dispersion comprises a liquified gas selected from the group consisting of argon, halogenated hydrocarbon, oxygen, fluorine or krypton.

6. A method in accordance with claim 5 wherein the dispersion comprises liquified argon in a carrier of gaseous helium.

7. A method in accordance with claim 1 wherein the dispersion comprises a solid condensate of a gas or gas mixture.

8. A method in accordance with claim 7 wherein the solid condensate comprises $CO_2$.

* * * * *